United States Patent [19]

Askam

[11] 4,122,883

[45] Oct. 31, 1978

[54] TIRE FITTING APPARATUS

[75] Inventor: John F. Askam, Sutton Coldfield, England

[73] Assignee: Dunlop Limited, England

[21] Appl. No.: 772,922

[22] Filed: Feb. 28, 1977

Related U.S. Application Data

[63] Continuation of Ser. No. 563,829, Mar. 31, 1975, abandoned.

[30] Foreign Application Priority Data

Apr. 6, 1974 [GB] United Kingdom ............... 15364/74

[51] Int. Cl.² .............................................. B60C 25/06
[52] U.S. Cl. ................................................. 157/1.17
[58] Field of Search ............................ 151/1.17, 1.26

[56] References Cited

U.S. PATENT DOCUMENTS

| 2,602,494 | 7/1952 | Larson | 157/1.17 |
| 3,191,656 | 6/1965 | Edwards | 157/1.17 |
| 3,300,184 | 1/1967 | Ragolio | 157/1.17 X |

FOREIGN PATENT DOCUMENTS 1,105,413  12/1955  France ................................. 157/1.26

Primary Examiner—Al Lawrence Smith
Assistant Examiner—James G. Smith
Attorney, Agent, or Firm—Stevens, Davis, Miller & Mosher

[57] ABSTRACT

Tire fitting apparatus and tool for fitting a tire to a part of a wheel having one flange removed and no well comprising a member to engage the inside of the tire and a shank for connection of the tool to a force-applying means.

7 Claims, 6 Drawing Figures

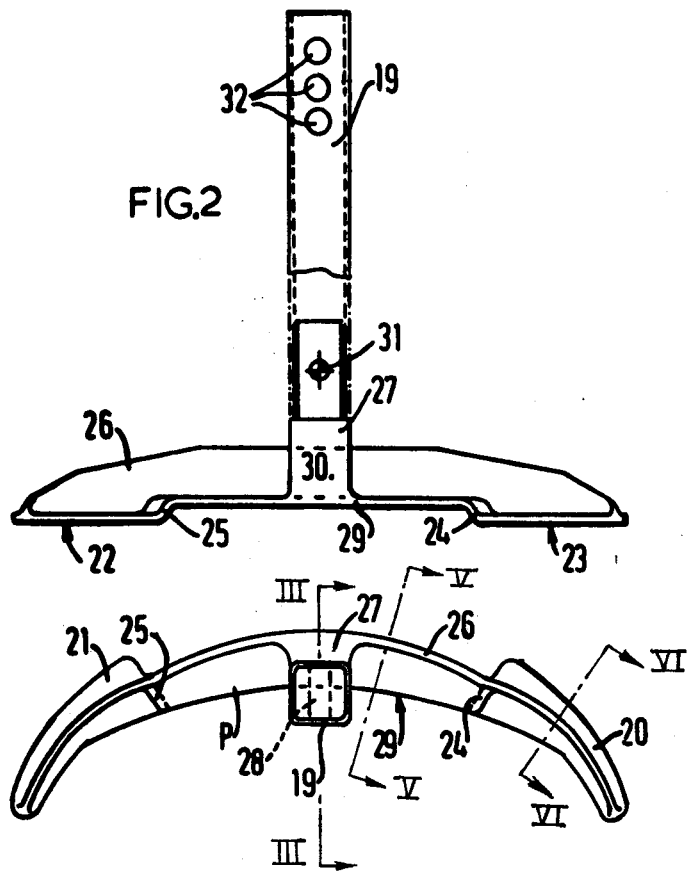

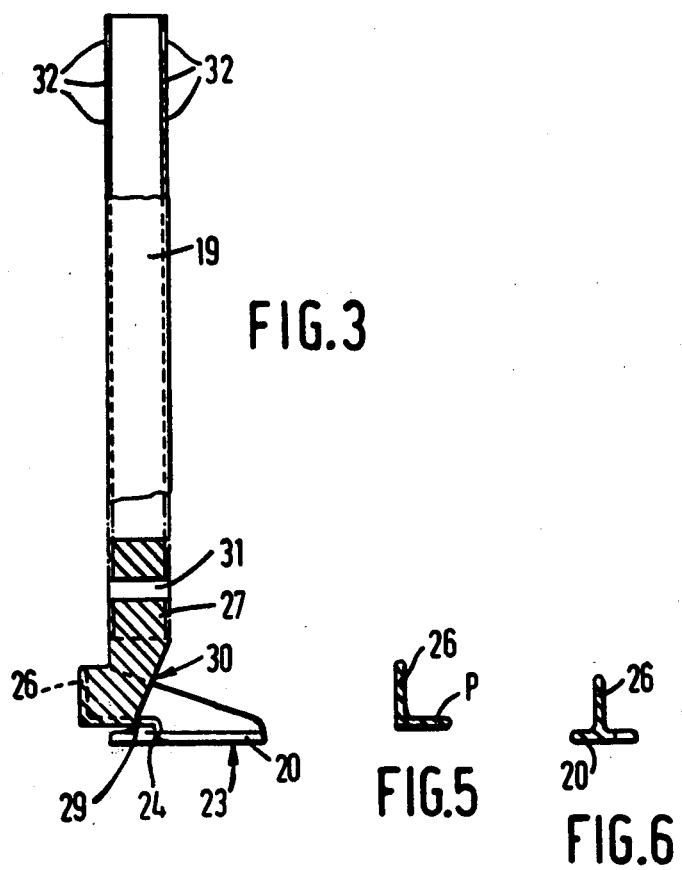

TIRE FITTING APPARATUS

This is a continuation of application Ser. No. 563,829 filed Mar. 31, 1975, now abandoned.

This invention relates to a tool and apparatus for fitting a tire to a part of a wheel having one flange removed and no well.

Fitting the tire to such a wheel is difficult since the bead diameter of the tyre is substantially the same as or sometimes slightly less than the diameter of the wheel between the flanges (in order to make a good air-tight seal) and since it is difficult to ensure that the plane of the bead is exactly perpendicular to the wheel axis. Considerable force thus has to be applied to the tire in order to locate the tire bead properly against the wheel flange which is not removed. The tool of the present invention is designed to facilitate this operation.

In accordance with the present invention a tire fitting apparatus includes a tool which comprises an elongated member having a first surface for engagement with the cylindrical surface of the wheel between the flanges during mounting of the tire thereto and a second surface on one side of the member for engagement with the interior surface of the tire in the tyre sidewall, lower sidewall or bead region and a shank extending from the side of the member opposite to said second surface for connection with a force applying means.

Preferably the member comprises a crescent-shaped plate and the said first surface comprises part of the concave edge of the plate together with a surface on the shank which is inclined to the length thereof. A second surface, preferably and here illustrated as two second surfaces, are provided, one at each end of the member, and the shank extends perpendicularly to the said plate from a position on the plate mid-way between the two ends. The two second surfaces may be spaced away from the side of the plate opposite to that from which the shank extends.

The shank preferably extends at an acute angle to the axis of the wheel and/or tire during the fitting operation.

One embodiment of the tool which and associated force applying means will now be described by way of example with respect to the accompanying drawings of which:

FIG. 2 shows a front view of the tool;

FIG. 3 shows a cross-section view of the tool on line III—III of FIG. 4;

FIG. 4 shows a plan view of the tool;

FIG. 5 shows a cross-section view on line V—V of FIG. 4, and

FIG. 6 shows a cross-sectional view on line VI—VI of FIG. 4.

Figure 1:
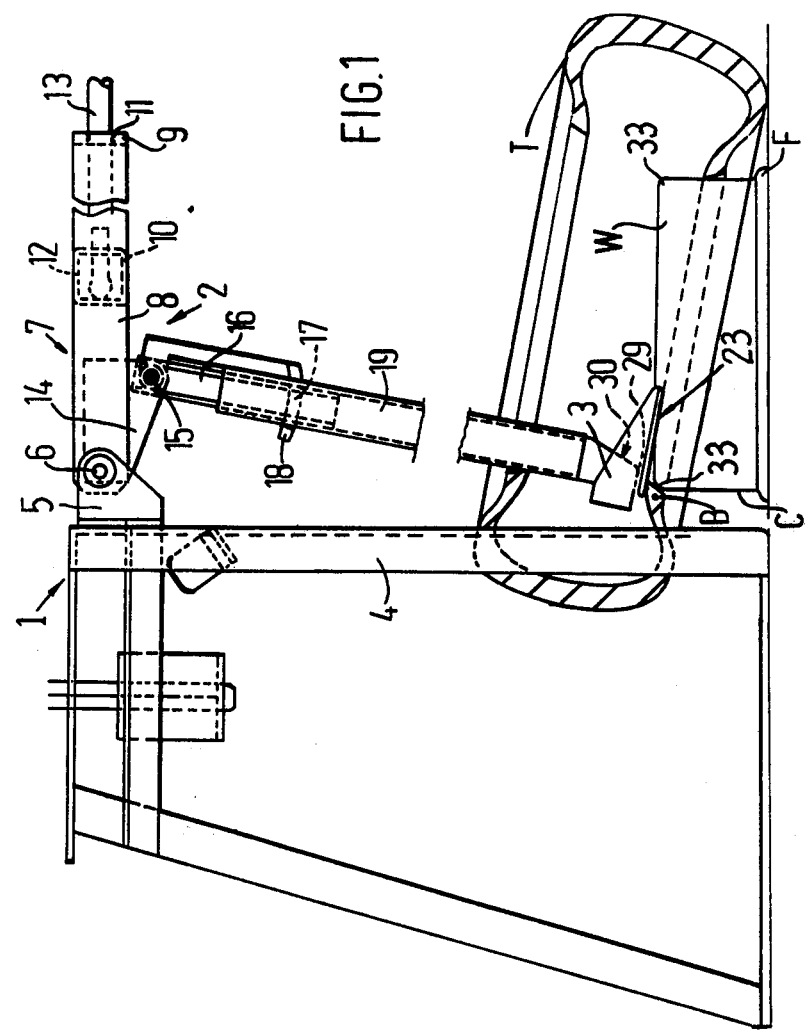
FIG. 1 shows a part side view part-sectional view of the tool and other apparatus in use.

The apparatus comprises a stand 1, a lever mechanism 2 whereby a force can be applied to the tool and the tool 3 itself.

The stand comprises three legs 4 and a triangular top frame all made of angle iron suitably welded together. Welded to one side of the top frame are two brackets 5 supporting a first horizontal pivot 6 for a socket member 7 comprising two parallel side members 8, a cross-piece 9 at the end further from the pivot and a second cross-piece 10 comprised of square section tubing approximately half-way along the length of the socket member. The first cross-piece 9 and the side of the tubular cross-piece 10 further from the first pivot are formed with holes 11, 12 into which a long lever 13 e.g. a tire fitting lever, approximately 3 - 4 feet long can be inserted to apply leverage to the socket member to rotate it about the first pivot 6.

Two triangular webs 14 are attached to the socket member 7 one to each side member 8. The two triangular webs support a second horizontal pivot 15 adjacent to the first pivot 6 on the side of the stand. This second pivot is displaced below the socket member 7 when the socket member is in a horizontal position (as shown in FIG. 1) by a vertical distance which is less than that of the horizontal distance between the two pivots 6 and 15. The second pivot rotatably supports a short length 16 of square section mild steel having bevelled edges and formed with a hole 17 and a peg 18 which can be swung on the pivot 15 into and out of engagement with the hole. The shank 19 of the tool 3 of the present invention which in this embodiment comprises square section tubing may be slidably secured to the short length 16 of mild steel by means of the peg 18.

The tool as shown in FIGS. 2 to 6 inclusive comprises an elongated plate P of crescent shape when viewed in plan (FIG. 4). At each end of the crescent the width of the plate is increased, by means of two curved portions 20 and 21 one at each end of approximately constant width providing the two second surfaces 22 and 23 for engaging the interior surface of the tire during mounting to the wheel. As can be seen in FIGS. 2 and 3 the end portions 20 and 21 are arranged to be displaced from the remaining central portion of the crescent shaped plate P, curved steps 24 and 25 being provided at the junctions between the end portions and the remainder of the plate. As can be seen in FIG. 4 the end portions taper slightly at the extremities of the plate where they are smoothly rounded.

Extending along the whole length of the curved plate is a supporting flange 26. At the center part of the plate the flange extends aong one side of the plate 19 so that in cross-section the member has the shape of the letter L (see FIG. 5) but at the end portions 20 and 21 of the plate this flange extends approximately down the center of the plate 19 so that in cross-section the plate has the form of a letter T (See FIG. 6).

Extending perpendicularly from the curved plate from the side opposite the said second surfaces for engaging the interior of the tire and mid-way between the two ends is a short stub 27 of square cross-section. The stub is displaced radially inwards from the longitudinal center line of the plate by a short distance so that the center 28 of the square section is slightly radially inwards of the inner curved edge 29 of the crescent shaped plate. (See in particular FIGS. 3 and 4). This stub is formed with a surface 30 inclined to the length of the stub which extends from the inner curved edge 29 of the crescent shaped plate. The surface of the edge 29 and the inclined surface 30 in this embodiment form the first surface referred to above for engaging with the cylindrical surface of the wheel during tire mounting.

The overall curvature and length of the plate is such that it will readily fit inside a tire with the center of the inner curved edge 29 abutting the cylindrical surface of the wheel W and the two second surfaces 22 and 23 engaging the interior surface of the tire radially outwards of the toe of the bead B. It is because of the curvature in a radial plane that the two second surfaces are spaced apart from the central portion of the plate P. The tool shown in the drawings is devised to suit a range of different tire (and wheel) sizes, the overall curvature of the tool matching that of tires having bead seat diameters of between approximately 300 and 400 mm. The tool has the following dimensions:

Overall length (straight line tip to tip): 390 mm
Radius of outer edge of central portion: 205 mm
Radius of inner edge of central portion: 310 mm All other dimensions are in proportion to the above.

Connected to the stub 27 by means of a roll pin 31 is a shaft of square section tubing which together with the stub forms the tool shank 19. At its end further from the crescent shaped plate, the shank is provided with a plurality of spaced-apart holes 32. When this shank 19 is slidably connected to the short length 16 of square section mild steel pivotally connected to the second pivot 15 the peg 18 engages in one of these pairs of holes 32 and also in the hole 17 in the short length of square section mild steel. By means of this telescopic arrangement between the shank 19 of the tool and the short length 16 of square section mild steel the overall length of the tool between the second pivot 15 and the two second surfaces 22 and 23 may be adjusted as required to suit a particular size of wheel and tire being operated upon.

In use of the apparatus the wheel W is laid horizontally on the ground beneath the socket member 7, the removable flange of the wheel having been removed and the other flange F being in contact with the ground. A tire T is laid over the wheel with its plane inclined to the horizontal. The operator then moves the socket member to lower the tool 3 of the present invention which hangs down from the second pivot 15 with the shank 19 approximately vertical and puts the tool inside the tire T with the two second surfaces 22 and 23 in engagement with the interior surface of the sidewall which is nearer the ground. The second surfaces engage the interior surface of the tire at the sidewall, lower sidewall or bead region thereof depending on the tire size. In this position the shaft of the tool is not vertical but at an acute angle to the vertical i.e. to the axis of the wheel and tire.

Force is applied along the length of the shaft downwards on the tool by means of the lever 13 inserted in the socket member 7. The inner curved edge 29 of the curved plate, approximately equidistant between the extremities of the curved plate is thus caused to come into contact with and slide around the curved portion 33 of the rim section, sweeping the tire bead B before it and on to the rim section. The second surfaces also force the tire downwards during this operation. Further downward force causes the inclined surface 30 on the shaft to engage with the curved portion 33 of the wheel rim section and slide downwards on it so that the tire bead B is forced to move downwards across the cylindrical part of the wheel towards the flange F. The operation can be repeated with the tool in engagement with another part of the interior surface of the tire in order to insure that the bead of the tyre closer to the ground is in engagement with the flange over the whole circumferential length of the tire and wheel.

During the fitting operation during the first part of the movement of the lever when the socket member is in an approximately vertical position the mechanical advantage is greater than it is during the later part of the operation when the socket member is approximately horizontal. This is because of the variation in horizontal distance between the second pivot 15 and the first pivot 6. During the first portion of movement the second pivot is almost vertically above the first pivot and the horizontal distance between the two pivots is small. When the socket member is horizontal as shown in FIG. 1 the horizontal distance between the two pivots is at its maximum.

It should be noted that in FIG. 1 the socket member is shown horizontal i.e. in the position it occupies towards the end of its downward movement and the downward movement of the tool. However the tire T is shown in its position before mounting on the wheel W, the tool being in the position it occupies when the socket member is approximately vertical and before the downward movement of socket member, tool and tire.

Having now described my invention - what I claim is:

1. A tire fitting apparatus comprising: force applying means connected to a support, a flat arcuate plate and a shank extending from one side of said plate substantially perpendicular to the plane thereof and pivotally connected to said force-applying means, two end surfaces, one at each end of the plate, and a central surface disposed between said two surfaces being provided on the other side of the plate, the two end surfaces being coplanar, the common plane being parallel to and spaced apart from the plane of the central surface and being further from said one side than the plane of the central surface, and a surface for engagement with a wheel rim said surface being inclined to the length of the shank, the direction of inclination being such that a part of the surface further from the plate is nearer to the center of curvature of an edge of the plate in a radial sense than a part of the surface nearer to the plate said surface being on the shank and generally facing said center of curvature.

2. A tire fitting apparatus according to claim 1 wherein the plate comprises a crescent-shaped plate.

3. A tire fitting apparatus according to claim 1 wherein the shank extends from a position on the plate mid-way between the two ends thereof.

4. A tire fitting apparatus according to claim 1 wherein the length of the shank is adjustable.

5. A tire fitting apparatus according to claim 1 wherein the force applying means comprises a lever means.

6. A tire fitting apparatus according to claim 1 wherein said support comprises a stand, the force applying means comprises a lever pivotally connected to the stand to pivot about an horizontal axis, and the shank of the tool being pivotally connected to the lever to pivot about an horizontal axis.

7. A tire fitting apparatus according to claim 6 comprising a first pivotal connection for the lever on the stand, a second pivotal connection for the shank on the lever, the axis of the second connection being positioned to one side of the longitudinal axis of the lever by a distance which is less than the distance between the two pivotal connections measured along the length of the lever.

* * * * *